May 14, 1946.  J. C. BOLINGER ET AL  2,400,386
HYDROGEN FLUORIDE ALKYLATION OF PARAFFINS
Filed Nov. 15, 1944
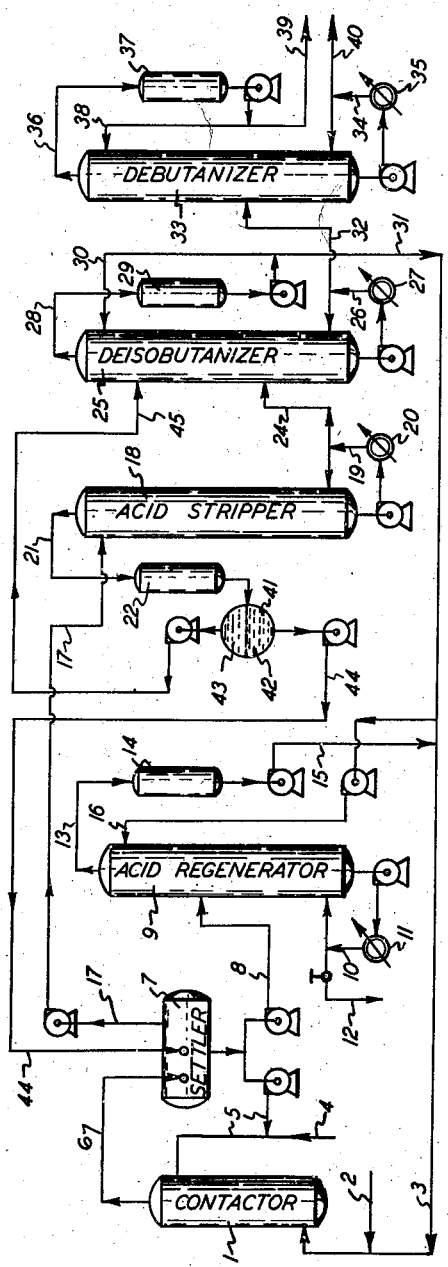
J. C. BOLINGER
A. K. BRUMBAUGH
J. H. CURTIS
INVENTORS
Paul W. Brigman
ATTORNEY Patented May 14, 1946

2,400,386

UNITED STATES PATENT OFFICE 2,400,386

HYDROGEN FLUORIDE ALKYLATION OF PARAFFINS

John C. Bolinger, San Marino, Andrew K. Brumbaugh, Inglewood, and James H. Curtis, Redondo Beach, Calif., assignors to Socony-Vacuum Oil Company, Incorporated, New York, N. Y., a corporation of New York Application November 15, 1944, Serial No. 563,538

1 Claim. (Cl. 260—683.4)

This invention has to do with processes for the alkylation of paraffin hydrocarbons with olefins, such as the alkylation of isobutane with butene to form isooctane, and particularly with such processes wherein the catalyst used is hydrofluoric acid or material of the type of that catalyst, such as certain fluorides, other halides and the like.

In such processes the general scheme of operation is one in which a hydrocarbon feed stream containing the paraffinic and olefinic reactants is contacted with the liquid catalyst and the reaction mixture passes to a settler in which a hydrocarbon phase separates from an acid phase. The acid is returned to the contacting step, a small proportion of the cycled stream being split off and treated to remove impurities. The hydrocarbon phase is heated to remove entrained acid, which is returned to the contacting step. The deacidified hydrocarbons are twice fractionated, to remove isobutane, which is recycled, and to remove normal butane, which is withdrawn from the system. The residue from the second fractionation is the crude alkylate product.

The present invention has to do with that stage of the process in which the hydrocarbon phase is heated and partially distilled to remove acid and the acid is returned to the contacting step.

The general operating scheme, which in its major elements is conventional, is illustrated in the attached diagrammatic drawing, to which reference is here made.

A liquid to liquid contactor 1 is supplied with an isobutane+butene mixture at 2 and with a recycled stream of isobutane at 3. The contactor is also supplied at 4 with a small quantity of make-up acid (hydrogen fluoride) as required, and at 5 with a larger stream of recycled acid.

After contacting under suitable conditions of time and temperature, the reaction mixture passes through conduit 6 to a settler 7 in which an acid phase (below) separates from a hydrocarbon phase (above). The acid phase is withdrawn from the settler and divided into two streams, the major portion returning directly to the contactor through conduit 5. A minor proportion of the order of 1% to 2% by volume, is diverted through a conduit 8 to an acid regenerator 9. This element is a plate or packed tower, heated by circulation of bottoms through a loop 10 including a reboiler 11 and having a valve-controlled outlet 12 through which a small quantity of relatively nonvolatile hydrocarbon (the so-called "polymer") is more or less continuously withdrawn from the system.

In the acid regenerator the volatile constituents of the diverted acid stream (acid, water and dissolved or entrained volatile hydrocarbons) are vaporized, passing through 13 to condenser 14 and thence through conduit 15 and isobutane recycle main 3 to contactor 1. This tower is usually refluxed with isobutane which may be withdrawn from recycle main 3 upstream from its junction with conduit 15, as through conduit 16.

By this step of distillation of a side stream of used acid the polymers, which are a minor side product of the catalysis, are prevented from building up in the acid cycle.

The hydrocarbon phase, which contains some entrained acid, is withdrawn from the settler through conduit 17 and introduced into the upper part of an acid stripper 18, which may be any preferred form of fractionating tower. This element is heated by the circulation of bottoms through a loop 19 including a reboiler 20. The stripper distils out the entrained acid, together with some volatile hydrocarbons, the vapor passing through conduit 21 to a condenser 22, the condensate from which is disposed of in a manner to be described.

The major proportion of the bottoms, a substantially acid-free mixture of various hydrocarbons, is directed through conduit 24 to a first fractionating tower 25 (the deisobutanizer). This element is a plate fractionating tower heated by a circulation of bottoms through a loop 26 including a reboiler 27. The overhead from the tower, consisting of excess isobutane, passes through conduit 28 to a condenser 29 from which a portion of the condensate is returned as at 30 as reflux liquid. The remainder of the condensate is, in ordinary practice, returned through conduit 31 to isobutane recycle main 3 and through it to the contactor.

The bottoms from tower 25, aside from the part returned to the base of the tower for heating purposes, are directed through conduit 32 to a second fractionating tower 33 (the debutanizer) which is heated by a circulation of bottoms through a loop 34 including a reboiler 35. The overhead fraction from this tower consists of normal butane, which passes as vapor through 36 to a condenser 37. The condensate is in part returned to the top of the tower as at 38, as reflux liquid, the remainder being withdrawn from the system as at 39.

The bottoms from the debutanizer, being the crude alkylate product of the process, are withdrawn from the system as shown at 40. This product is subject to further steps of purification by contact with a solid adsorbent and of fractionating into light and heavy alkylates, with which we are not here concerned.

We return now to the disposal of the overhead stream from the acid stripper 18, which is the subject matter of the present invention.

The conventional procedure is to return the overhead from the acid stripper directly to settler 7, in which it joins the reaction mixture coming from the contactor. The feed to the contactor must contain a large excess of isobutane over the calculated quantity, to ensure complete utilization of the butene content of the feed stream. The overhead from the acid stripper consists to a large extent of this excess isobutane and to a smaller extent of acid entrained in the reaction mixture. As the hydrocarbon phase in settler 7 is free from butenes, none of the isobutane returned to it in the present practice is consumed. The result is the establishment of a wholly nonfunctional cycle, including the settler and the stripper, in which isobutane is repeatedly distilled without undergoing any change.

We improve on this present practice in delivering the stream of condensate from condenser 22 (the overhead from the acid stripper consisting, as said, largely of isobutane) into a secondary settling vessel 41 in which a layer of acid 42 separates from a hydrocarbon layer 43. The acid is continuously withdrawn from the lower layer and passes through conduit 44 to primary settler 7, from which it is cycled back to the contactor as first described. The isobutane is withdrawn from the upper layer and passes through conduit 45 into the deisobutanizer 25 from which it returns as overhead to recycle main 3 and thus to the contactor.

The advantage in this procedure over the present practice is in eliminating the nonfunctional settler-stripper cycle above described and in correspondingly reducing the duty on the stripper. As in the present practice, the quantity of isobutane returned to the settler from the stripper is at least equal to the quantity brought to the settler as a component of the reaction mixture, the load on the stripper is reduced by approximately one-half in directing the hydrocarbon content of the stripper overhead to the deisobutanizer, from which it returns to the initial contacting step in which it is useful.

The load on the deisobutanizer is little if at all increased by this change, as the isobutane from the secondary settler is substantially free from heavier hydrocarbons and may thus be utilized to replace part or all of the reflux liquid otherwise returned to this tower from its own overhead stream.

We claim as our invention:

In an alkylation process involving the steps of contacting a feed stream consisting substantially of butenes and isobutane with a body of liquid hydrofluoric acid, of withdrawing from said body a hydrocarbon stream consisting substantially of alkylate and unreacted isobutane and including a modicum of said acid; of settling from said stream a portion of said included acid and returning said acid to said body, of subjecting said stream to a first distillation in which the remainder of said acid together with a portion of said isobutane is removed from said hydrocarbon stream, of subjecting the residual stream to a second distillation in which the remainder of said isobutane is separated from said alkylate and of returning said last isobutane to the feed stream entering said acid body: the steps of condensing the vapors resulting from said first distillation, of parting said condensate to obtain an acid phase and a hydrocarbon phase, of returning said acid phase to said acid body, and of introducing said hydrocarbon phase into said second distillation wherein its isobutane content is distilled out and returned to said feed stream.

JOHN C. BOLINGER.
ANDREW K. BRUMBAUGH.
JAMES H. CURTIS.